(12) United States Patent
Marechal

(10) Patent No.: US 8,882,037 B2
(45) Date of Patent: Nov. 11, 2014

(54) SYSTEM FOR FASTENING A SEAT, IN PARTICULAR FOR AN AIRCRAFT, ON SAID AIRCRAFT

(75) Inventor: Xavier Marechal, Paris (FR)

(73) Assignee: Attax, Carrieres sur Seine (FR)

( * ) Notice: Subject to any disclaimer, the term of this patent is extended or adjusted under 35 U.S.C. 154(b) by 37 days.

(21) Appl. No.: 13/433,889

(22) Filed: Mar. 29, 2012

(65) Prior Publication Data

US 2012/0273616 A1 Nov. 1, 2012

(30) Foreign Application Priority Data

Mar. 30, 2011 (FR) ...................................... 11 52621

(51) Int. Cl.
*B64D 11/06* (2006.01)

(52) U.S. Cl.
USPC ...................................... 244/118.6; 410/104

(58) Field of Classification Search
USPC ........ 244/118.6, 137.2, 122 R; 410/105, 104; 248/429
See application file for complete search history.

(56) References Cited

U.S. PATENT DOCUMENTS

| | | | | |
|---|---|---|---|---|
| 4,396,175 A | * | 8/1983 | Long et al. | 248/503.1 |
| 7,607,613 B2 | * | 10/2009 | Frantz et al. | 244/118.6 |
| 7,837,145 B2 | | 11/2010 | Wodak | |
| 2005/0211836 A1 | | 9/2005 | Frantz et al. | |
| 2007/0253762 A1 | * | 11/2007 | Hudson | 403/83 |
| 2008/0149764 A1 | | 6/2008 | Frey | |
| 2011/0006160 A1 | | 1/2011 | Marechal | |

FOREIGN PATENT DOCUMENTS

| | | |
|---|---|---|
| DE | 29825000 | 3/2004 |
| DE | 102005033048 | 1/2007 |
| DE | 202008002107 | 7/2008 |
| WO | 2009/102911 | 8/2009 |

OTHER PUBLICATIONS

French Search Report dated Nov. 11, 2011, corresponding to Foreign Priority Application No. 11 52621.

\* cited by examiner

*Primary Examiner* — Brian M O'Hara
(74) *Attorney, Agent, or Firm* — Young & Thompson

(57) ABSTRACT

System for fastening a seat, on the rest of an aircraft, of the type including a base associated with the rest of the seat and including hooking elements thereof on the rest of the aircraft, which can be moved between a retracted assembly/disassembly position of the seat and an active hooking position thereof on the rest of the aircraft, and locking elements for locking the hooking elements in the active position. The hooking elements include at least one hook-shaped heel to be engaged in an opening of the rest of the aircraft, and by movement of the base, under a hooking shoulder thereof, and the locking elements in the active position include pin-shaped locking members supported by the base and that can be moved between a position retracted in the base and an active position wherein the pin-shaped locking elements protrude from the base into an opening of the aircraft.

10 Claims, 2 Drawing Sheets

SYSTEM FOR FASTENING A SEAT, IN PARTICULAR FOR AN AIRCRAFT, ON SAID AIRCRAFT

BACKGROUND OF THE INVENTION

Figure 1:
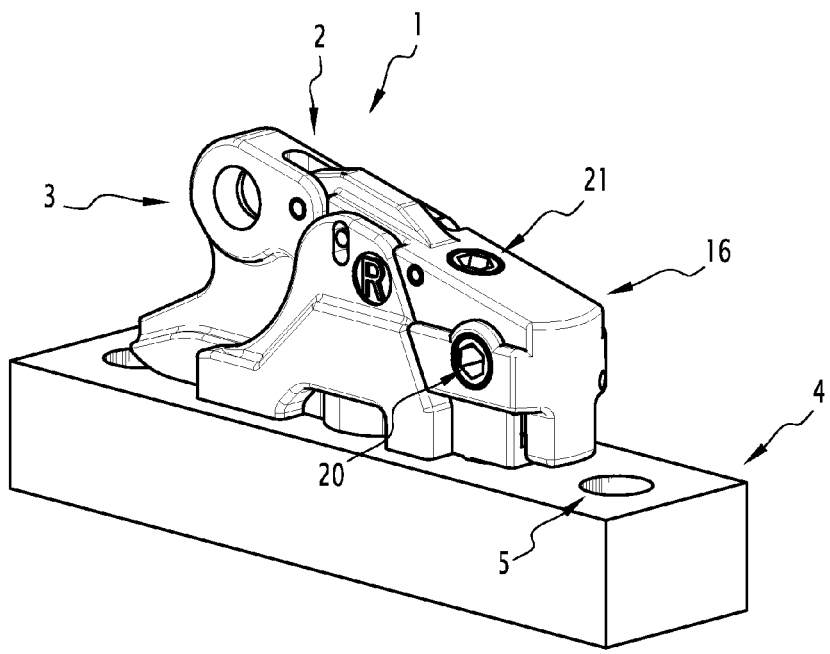

The present invention relates to a system for fastening a seat, in particular for an aircraft, on the rest of said aircraft.

More particularly, the invention relates to a system of this type that comprises a base associated with the rest of the seat and that comprises hooking means for hooking said seat on the rest of the aircraft, which can be moved between a retracted assembly/disassembly position for the assembly/disassembly of the seat and an active hooking position thereof on the rest of the said aircraft, and locking means for locking said hooking means in the active position to lock the seat in position.

DESCRIPTION OF THE RELATED ART

Many fastening systems for this type of application are already known in the state of the art.

These systems have been developed to facilitate the assembly and disassembly of aircraft seats on and of said aircrafts.

Different possible embodiments of the hooking means have also been described depending on the nature of the complementary hooking means provided on the aircraft.

In fact, said aircraft may for example comprise rails or anchor openings intended to receive the base.

Documents WO 2009/102911 and DE 10 2005 033 048 describe examples of fastening systems of this type, which are intended for aircrafts whereof the floor is equipped with aligned anchor openings.

However, all of the systems of the state of the art have a certain number of drawbacks, in particular relative to their hooking reliability, and the ease of assembly and disassembly, since the locking and unlocking thereof in position on the aircraft requires relatively tedious, lengthy, and restrictive operations for the operator.

SUMMARY OF THE INVENTION

The aim of the invention is therefore to resolve these problems.

To that end, the invention relates to a system for fastening a seat, in particular for an aircraft, on the rest of said aircraft, of the type comprising a base associated with the rest of the seat and comprising hooking means for hooking said seat on the rest of the aircraft, which can be moved between a retracted assembly/disassembly position for the assembly/disassembly of the seat and an active hooking position thereof on the rest of the said aircraft and locking means for locking said hooking means in the active position to lock the seat in position, characterized in that the hooking means comprise at least one hook-shaped heel adapted to be engaged in an opening of the rest of the aircraft and to be engaged by movement of the base, under a hooking shoulder thereof, and in that the locking means for locking said hooking means in the active position comprise pin-shaped locking means borne by the base and that can be moved between a retracted position in said base and an active position wherein said pin-shaped locking means protrude from said base into an opening of the aircraft.

According to other features considered alone or in combination:
- the base comprises heel-shaped means close to each of its ends, and adapted to each cooperate with a corresponding opening of the rest of the aircraft,
- the pin-shaped locking means are arranged in the base between the heel-shaped means at each end of the base and are adapted to cooperate with a corresponding opening of the rest of the aircraft located between the two openings intended to receive said heel-shaped means,
- it comprises elastic means for elastically stressing the pin-shaped locking means in the retracted position in the base,
- the pin-shaped locking means can be moved via a lever that can be operated by an assembly operator between a retracted unlocking position and an active locking position of the pin-shaped locking means in the locking position of the hooking means,
- the pin-shaped locking means are associated with an intermediate portion of the lever, located between one end thereof hinged on the base and another end thereof associated with disengageable means for locking the lever in the locking position,
- the disengageable means of the lever comprise latch-shaped means borne by one of the members, lever or base, and adapted to cooperate in the active position with the retaining means of the other organ, base or lever, to lock the lever in the active position, the latch-shaped means being movably mounted on the corresponding member against the stress from the elastic means, to allow said latch-shaped means to cross the retaining means and engage in the locking position therewith and to be released from said retaining means under the action of rotary maneuvering means during disengagement thereof,
- the maneuvering means can be operated by a tool that can be manipulated by a disassembly operator, and
- the or each opening of the rest of the aircraft has a generally cylindrical shape with two portions having different diameters connected by the hooking shoulder.

BRIEF DESCRIPTION OF THE DRAWING FIGURES

Figure 2:
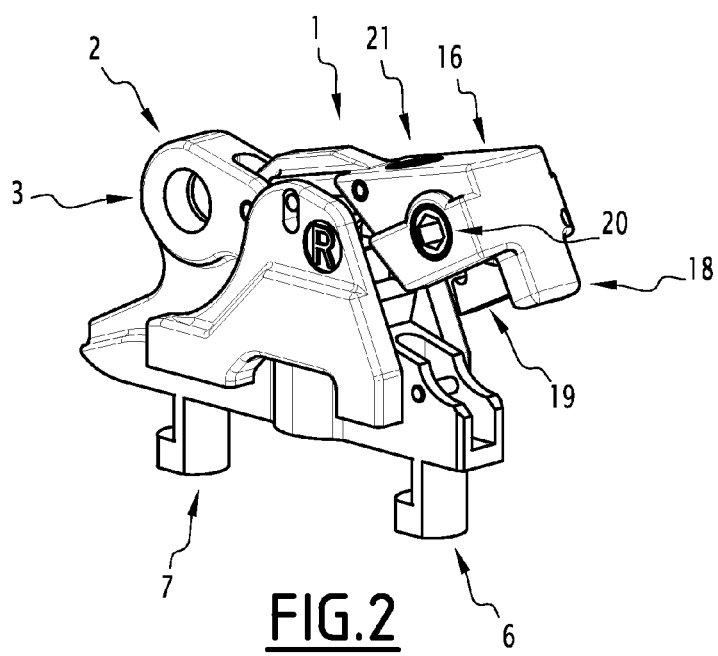
Figure 3:
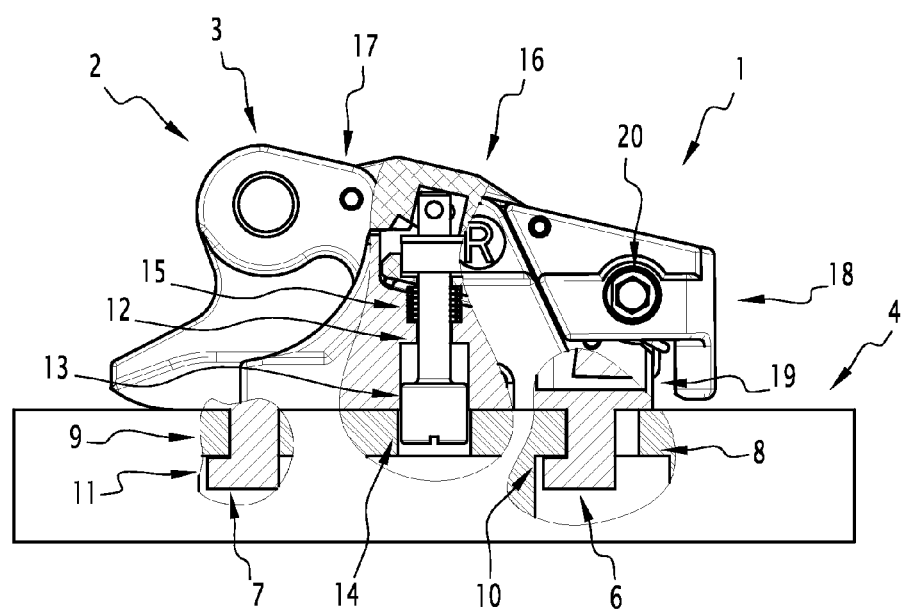

The invention will be better understood using the following description, provided solely as an example and done in reference to the appended drawings, in which:

FIG. 1 is a perspective view of one example of an embodiment of a fastening system for a seat according to the invention, in the anchoring position for the rest of the aircraft, FIG. 2 is a perspective view of a fastening system according to the invention, in the unlocked position, and FIG. 3 is a side view with cross-sectional portions illustrating the structure and operation of the system according to the invention, in the anchoring position on an aircraft.

DETAILED DESCRIPTION OF THE INVENTION

In these figures, and in particular in FIG. 1, a system is illustrated for fastening a seat, in particular for an aircraft, on the rest of said aircraft.

The system is designated by general reference 1 in this figure, and traditionally comprises a base designated by general reference 2 and associated with the rest of the seat, for example through fastening means thereof on said base, designated by general reference 3.

This base comprises hooking means of the seat on the rest of the aircraft, said aircraft being designated by general reference 4 in this figure and for example comprising a series of aligned anchor openings, one of which is for example designated by general reference 5. These openings are then for example formed in the floor of the aircraft.

Traditionally, this space and, more specifically, the hooking means thereof on the rest of the aircraft, can be moved between a retracted assembly/disassembly position for the assembly/disassembly of the seat and an active hooking position thereof on the rest of the said aircraft.

One can then see that locking means are also provided for locking said hooking means of the base, and therefore of the seat, on the rest of the aircraft, in the active locking position.

These different means are illustrated in more detail in FIGS. 2 and 3, in which the system according to the invention is shown designated by general reference 1, the base designated by general reference 2, and the aircraft designated by general reference 4.

In fact, and as illustrated in these figures, the hooking means provided on the base, and more particularly under the lower surface thereof, comprise at least one hook-shaped heel adapted to be engaged in an opening of the rest of the aircraft while moving axially therein and to be engaged, by transverse movement after a movement of the base and the seat by an operator, under a hooking shoulder thereof.

In the example illustrated in these figures, the base comprises heel-shaped means near each of its ends, each of these heel-shaped means being adapted to cooperate with a corresponding opening and shoulder of the rest of the aircraft for hooking of the base and seat.

In FIGS. 2 and 3, the heel-shaped means are designated by general references 6 and 7, and are therefore situated near each of the ends of the base.

Each of these heel-shaped means is then adapted to be engaged in a corresponding opening of the rest of the aircraft, designated by references 8 and 9, respectively, and to be engaged under a hooking shoulder, designated by references 10 and 11, respectively.

One can then see that during the assembly or disassembly of the base, the operator first engages the heel-shaped means of that base in the corresponding openings 8 and 9.

Once this operation is done, the operator can move the heels of said base under the corresponding hooking shoulders 10 and 11 by moving the seat and the base.

It will be noted in this respect that the or each opening of the aircraft has a general cylindrical shape with two portions of different diameters, connected by the corresponding hooking shoulder.

The upper portion of the opening has a diameter allowing the passage of the heel and the lower portion has a larger diameter making it possible to define the corresponding shoulder.

Once in this hooking position, the operator can lock the base in the active position, and therefore lock the seat in position in the aircraft.

To that end, the base also comprises locking means for locking said hooking means of the base and the seat in the active position on the rest of the aircraft, said locking means comprising a pin-shaped locking means, for example cylindrical, supported by the base and movable between a retracted position in said base and an active position wherein said pin-shaped locking means protrude from the base into an opening of the aircraft.

In the embodiment illustrated in these figures, these pin-shaped locking means are designated by general reference 12 and are mounted to be slidably movable in a corresponding well 13 of the base. This illustrated well is for example perpendicular to the lower portion of the base.

These pin-shaped locking means that are supported by the base can thus be moved between a retracted position into said base, as illustrated in FIG. 2, and an active position wherein they protrude from the base and are engaged in an opening of the aircraft is illustrated by FIG. 3, to lock the base and therefore the seat in position.

In the embodiment illustrated in this FIG. 3, the corresponding opening of the aircraft, intended to receive the pin-shaped locking means, is designated by general reference 14 and is located between the two openings intended to receive the heel-shaped means 6 and 7 of the base, said openings being designated by general references 8 and 9.

It will then be noted that these pin-shaped locking means 12 are associated, in the described example, with elastic means for stressing them in the retracted position in the base, for example comprising means such as a helical spring, designated by general reference 15, inserted between the base and said means.

Of course, other embodiments can be considered, and the spring can thus be associated with buffers made from elastic or other material.

Said pin-shaped locking means 12 can then be moved between their positions, via a lever designated by general reference 16 in these figures, which in turn can be moved as illustrated, by an assembly operator, between a retracted unlocking position illustrated for example in FIG. 2, and an active locking position of the pin-shaped locking means in the locking position as illustrated in FIG. 3.

In fact and in the example illustrated in these figures, the corresponding end of the pin-shaped locking means 12 is associated with an intermediate portion of the lever 16 situated between one end thereof, designated by general reference 17, articulated on the rest of the base, and another end thereof designated by general reference 18 and provided with disengageable means for locking the lever in the locking position, designated by general reference 19.

Different embodiments of these locking means can be considered.

Thus for example, and traditionally, these disengageable means for locking the lever comprise latch-shaped means supported by one of the members, lever or base, and adapted to cooperate in the active position with the retaining means of the other member, base or lever, to lock the lever in the active position.

These latch-shaped means are movably mounted on the corresponding member against the stress of elastic means to allow said latch-shaped means to cross the retaining means and engage in the locking position therewith, and to free said retaining means under the action of rotary maneuvering means during the disengagement thereof.

The structure of these means also being known, it will not be described in more detail hereafter.

It will simply be noted that the rotary maneuvering means for disengaging the locking means for example comprise one or more maneuvering cavities adapted to receive a tool that can be manipulated by the disassembly operator, one of said cavities for example being designated by general reference 20 in this figure and being accessible by the lever side in the described example, and another being designated by general reference 21 and being accessible by the upper part of the lever in that example.

One can then see that when this base is positioned relative to the rest of the aircraft, the assembly operator first positions the or each base associated with the seat opposite the corresponding openings of the rest of the aircraft.

Once in this position, the operator causes the or each hook-shaped heel of the base to enter a corresponding opening of the rest of the aircraft, then moves the seat and base slightly to engage the heels thereof under the or each corresponding shoulder of the or each concerned opening of the aircraft.

Once in this position, the operator lowers the maneuvering lever 16 of the means for locking the base in position so as to engage the corresponding end of the pin-shaped locking means 12 in the corresponding opening of the aircraft in order to lock the base, and therefore the seat, in position.

When the operator wishes to disassemble the seat, he needs only use a suitable tool such as an appropriate key, to disengage the means for locking the lever in the locking position, to cause the latter, and therefore the pin-shaped locking means 12, to rise outside the opening of the rest of the aircraft.

This then releases the base and the seat.

The operator can then push the seat and the or each corresponding base so as to free the hook-shaped heel(s) from the corresponding hooking shoulders so as to free the seat and allow it to be disassembled.

Other embodiments can of course also be considered.

The invention claimed is:

1. A system for fastening a seat, comprising:
   a seat base (2);
   hooking means on said seat base, the hooking means for hooking said seat base on a portion of an aircraft (4), the portion of the aircraft (4) including i) a first opening (8, 9) and a hooking shoulder (10, 11) located at the first opening (8, 9), and ii) a second opening located spaced apart from said first opening, where each opening is separate and discrete, which hooking means is movable between i) a retracted assembly/disassembly position for the assembly/disassembly of the seat and ii) an active hooking position on the portion of the aircraft (4), wherein the hooking means comprise at least one hook-shaped heel (6, 7) adapted to be engaged in the first opening (8, 9) and to be engaged by movement of the base (2), under the hooking shoulder (10, 11);
   locking means for locking said hooking means in the active hooking position, wherein the locking means comprise pin-shaped locking means (12) borne by the base (2) and movable within a well of the base between a retracted unlocking position in said base (2) and an active locking position with said pin-shaped locking means protruding from said base into the second opening (14); and
   a lever (16), operable by an assembly operator, that moves the pin-shaped locking means (12) between i) the retracted unlocking position, and ii) the active locking position with the pin-shaped locking means (12) locking the hooking means in place engaged under the hooking shoulder (9, 10) in the active hooking position, wherein the lever (16) includes i) a first end (17) articulated on the base (2), ii) a second end (18) provided with disengageable locking means (19) for locking the lever (16) in the active locking position, and iii) an intermediate portion hingedly attached on one end of the pin-shaped locking means (12), the intermediate portion being situated between the first end (17) and the second end (18), and wherein the pin-shaped locking means (12) is movable between the retracted unlocking position and the active locking position by the intermediate portion of the lever (16).

2. The fastening system according to claim 1, wherein, the portion of the aircraft (4) includes a pair of said first openings (8, 9), each first opening with the hooking shoulder (10, 11), and the second opening located between the pair of said first openings (8, 9), and the hooking means comprise two of said hook-shaped heels (6, 7), each of the hook-shaped heels (6, 7) located close to opposite ends of the base (2).

3. The fastening system according to claim 2, wherein the pin-shaped locking means (12) are arranged in the base (2) between the two hook-shaped heels (6, 7).

4. The fastening system according to claim 1, further comprising elastic means (15) for elastically stressing the pin-shaped locking means (12) in the retracted unlocking position in the base (2).

5. The fastening system according to claim 4, further comprising:
   rotary maneuvering means (20, 21) for disengaging the locking means,
   wherein the disengageable locking means (19) of the lever (16) comprise latch-shaped means supported by one of the lever (16) and the base (2), and adapted to cooperate in the active locking position with retaining means of the other of the base (2) and the lever (16), to lock the lever (16) in the active locking position, the latch-shaped means being movably mounted on the corresponding one of the lever (16) and base (2) against stress from the elastic means, to allow said latch-shaped means to cross the retaining means and engage in the active locking position therewith and to be released from said retaining means under action of the rotary maneuvering means (20, 21) during disengagement thereof.

6. The fastening system according to claim 5, wherein the maneuvering means (20, 21) can be actuated by a tool that can be manipulated by a disassembly operator.

7. The fastening system according to claim 4, further comprising:
   rotary maneuvering means (20, 21) for disengaging the locking means,
   wherein the disengageable locking means (19) of the lever (16) comprise latch-shaped means supported by the lever (16), and adapted to cooperate in the active locking position with retaining means of the base (2), to lock the lever (16) in the active locking position, the latch-shaped means being movably mounted on the lever (16) against stress from the elastic means, to allow said latch-shaped means to cross the retaining means and engage in the active locking position therewith and to be released from said retaining means under action of the rotary maneuvering means (20, 21) during disengagement thereof.

8. The fastening system according to claim 4, further comprising:
   rotary maneuvering means (20, 21) for disengaging the locking means,
   wherein the disengageable locking means (19) of the lever (16) comprise latch-shaped means supported by the base (2), and adapted to cooperate in the active locking position with retaining means of the lever (16), to lock the lever (16) in the active locking position, the latch-shaped means being movably mounted on the base (2) against stress from the elastic means, to allow said latch-shaped means to cross the retaining means and engage in the active locking position therewith and to be released from said retaining means under action of the rotary maneuvering means (20, 21) during disengagement thereof.

9. The fastening system according to claim 1, wherein the first opening (8, 9) has a generally cylindrical shape with two portions having different diameters connected by the hooking shoulder (10, 11).

10. The fastening system according to claim 1, wherein, in the retracted unlocking position, the intermediate portion of the lever (16) and the second end (18) provided with disengageable locking means (19) of the lever (16) are both in a raised position, and in the active locking position, the intermediate portion hingedly attached on one end of the pin-shaped locking means (12) and the second end (18) provided with disengageable locking means (19) of the lever (16) are both in a lowered position.

\* \* \* \* \*